(12) United States Patent
Bergel

(10) Patent No.: US 7,174,178 B2
(45) Date of Patent: Feb. 6, 2007

(54) DERIVING A MORE ACCURATE ESTIMATE FROM PREDICTION DATA IN CLOSED LOOP TRANSMIT DIVERSITY MODES

(75) Inventor: Itshak Bergel, Givat-Shemuel (IL)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 09/908,963

(22) Filed: Jul. 19, 2001

(65) Prior Publication Data

US 2003/0017835 A1 Jan. 23, 2003

(51) Int. Cl.
*H04B 7/00* (2006.01)
(52) U.S. Cl. .................................. 455/502; 504/101
(58) Field of Classification Search ............. 455/504, 455/101, 506, 505, 63, 522, 502
See application file for complete search history.

(56) References Cited

U.S. PATENT DOCUMENTS

| 5,999,826 | A | 12/1999 | Whinnett | |
|---|---|---|---|---|
| 6,590,532 | B1 | 7/2003 | Ogawa et al. | |
| 6,690,652 | B1 * | 2/2004 | Sadri | 370/252 |
| 6,748,024 | B2 * | 6/2004 | Kuchi et al. | 375/299 |
| 6,785,250 | B2 * | 8/2004 | Vayanos et al. | 370/335 |
| 2001/0031647 | A1 * | 10/2001 | Scherzer et al. | 455/562 |
| 2001/0046873 | A1 * | 11/2001 | Komatsu | 455/506 |
| 2002/0009156 | A1 * | 1/2002 | Hottinen et al. | 375/267 |
| 2002/0105961 | A1 * | 8/2002 | Hottinen et al. | 370/442 |

FOREIGN PATENT DOCUMENTS

| EP | 1 156 596 | 11/2001 |
|---|---|---|
| EP | 1 156 597 | 11/2001 |
| JP | 10-117162 | 5/1998 |
| KR | WO 99/67962 | * 12/1999 |
| KR | 2000-21097 | 4/2000 |
| KR | 2001-66407 | 7/2001 |
| WO | WO 00/72464 A1 | 11/2000 |
| WO | WO 00/79702 | 12/2000 |
| WO | WO 01/43309 A1 | 6/2001 |
| WO | WO 01/43311 A1 | 6/2001 |

OTHER PUBLICATIONS

Jen-Wei Liang et al., *Forward Link Antenna Diversity Using Feedback For Indoor Communication Systems*, Acoustics, Speech, and Signal Processing, 1995, ICASSP-95 International Conference on Detroit, MI, May 9-12, 1995, New York, NY, USA IEEE, pp. 1753-1755.

* cited by examiner

*Primary Examiner*—Joseph Feild
*Assistant Examiner*—S. Smith
(74) *Attorney, Agent, or Firm*—Trop, Pruner & Hu, P.C.

(57) ABSTRACT

Prediction of a future state of a channel from common pilot channel signals transmitted from a transceiver (e.g., a base station) may be formed at a mobile user equipment to control future transmission patterns of the transceiver at a specified time. The matching accuracy of the future transmission patterns to the channel may be improved by adaptively calculating channel prediction terms from past and present channel estimates. Using channel prediction terms, a wireless communication system with the base station having antennas operate in a closed loop transmit diversity mode, and a channel controller application at the mobile user equipment may select best antenna transmission characteristics for active antennas of the base station.

16 Claims, 7 Drawing Sheets

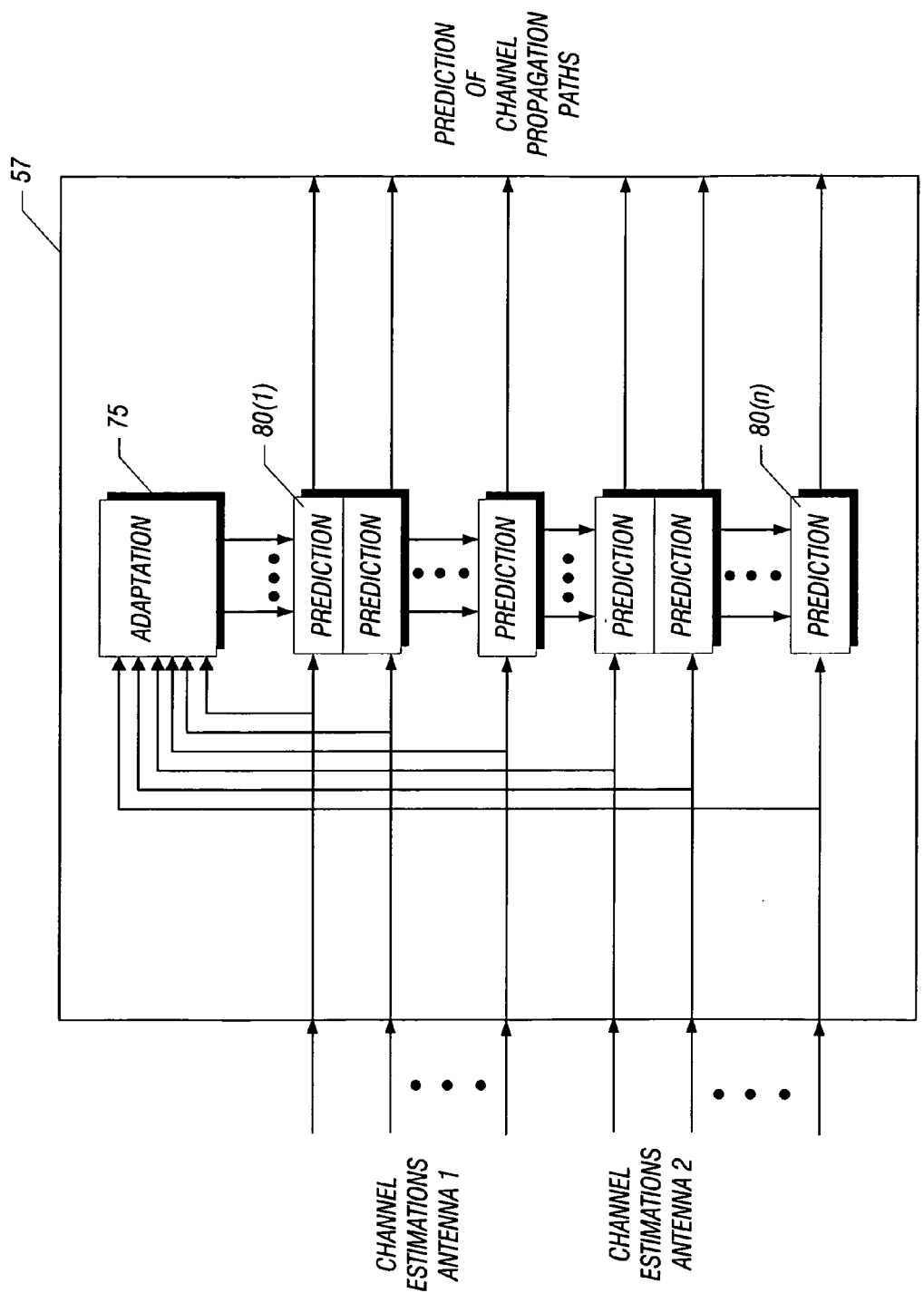

DERIVING A MORE ACCURATE ESTIMATE FROM PREDICTION DATA IN CLOSED LOOP TRANSMIT DIVERSITY MODES

BACKGROUND

The present invention relates generally to wireless communication systems, and more particularly to wireless communication systems that use channel estimation in closed loop transmit diversity modes.

In wireless communication systems (e.g., cellular systems) operating in a closed loop mode, increased network capacity or performance, i.e., the ability to carry more data between a base station and a mobile user unit, means increased profitability. When, for instance, a code division multiple access (CDMA) communication system operating in a closed loop mode transmits a communication from a base station over a transmission channel termed a traffic channel, several distortions including transmission and signal capture-related distortions may occur that can constrain any significant improvements in the network capacity or performance. Moreover, in a typical close loop mode, multiple active mobile user units may simultaneously access the traffic channel. In addition, a feedback channel from one or more targeted mobile user units of the multiple active mobile user units may be used to transmit feedback information to the base station. However, oftentimes signals in many wireless communication systems experience a variety of transmission and signal capture-related distortions such as fading and multipath interference. Therefore, the feedback channel may encounter some degree of fading and multipath interference as well. In some situations, this may result in a finite time delay in the communication from the one or more targeted mobile user units to the base station.

One technique of improving network capacity and performance is to reduce the finite time delay involved while transmitting and capturing feedback information over a feedback channel (e.g., a radio link) between the one or more targeted mobile user units and the base station. However, the delay that needs to be compensated, is mostly caused by the time needed to transmit the feedback information over the feedback channel. Thus, under these circumstances, a compensation for the finite time delay may be difficult to accomplish.

Specifically, to obviate fading of a transmission channel (e.g., the traffic and/or the feedback channels) in a closed loop mode where a mobile user unit may be moving slowly, a type of feedback power control may be used. However, when fading rate increases, as is the case with the mobile user unit moving at relatively higher speeds, a closed loop power control becomes practically ineffective. For overcoming multipath interference of a transmission channel, in a closed loop mode, channel estimation is typically performed as the multiple active mobile user units are prone to multipath fading, i.e., the traffic channel consists of more than one distinct propagation path for each mobile user unit of the multiple active mobile user units. Channel estimation typically includes determining channel parameters to compensate for certain transmission and signal capture-related distortions.

In order to perform channel estimation at the mobile station, the base station may transmit a pilot channel having one or more pilot symbols to the multiple active mobile user units for providing appropriate timing and other information. And, in turn, a targeted mobile user unit may acquire desired channel parameters that may be formed from the pilot channel using the pilot symbols. Examples of the pilot symbols include a pseudo noise (PN) code, a spreading sequence, or a scrambling sequence for the multiple active mobile user units seeking a base station with which to affiliate. However, channel estimation is generally limited only to detection and makes numerous limiting assumptions, such as an assumption regarding timing information for the traffic channel.

A variety of diversity modes have been widely used in closed loop modes in several wireless communication systems, as they purportedly provide better signal qualities in fading channel environments while significantly increasing network capacity and performance. A diversity mode essentially entails transmitting or receiving a signal with at least two antennas where at least two different parameters including location or polarization are used. A diversity mode may be applied to transmit diversity or receiver diversity. In transmit diversity, "N" number of transmit antennas at a base station may be employed when "N" number of fading channels may need to be estimated in a mobile user unit making use of known pilot symbols from a pilot channel.

For instance, a CDMA communication system may use dual transmit diversity (i.e., two transmit and one receive antenna) for estimating multipath fading channels. However, at least in part due to a significantly long time delay involved with feedback in a closed loop, there may be lack of knowledge available concerning instantaneous channel states (e.g., timing and attenuation) for each multipath fading channel. In absence of precise channel state knowledge, therefore, it may not be possible to accurately estimate the channel parameters to adequately compensate for certain transmission and signal capture-related distortions.

Unfortunately, combination of feedback with channel estimation alone, in closed loop transmit diversity modes, may not provide adequate compensation to the antenna transmission because the channel estimation may not keep up with a quickly changing transmission channel between a base station and a mobile user unit that may be moving. Therefore, while communicating using transmit diversity in a closed loop mode between a base station to a mobile user unit, an improved compensation technique for transmission over a channel is desired accordingly.

Thus, there is a need to accurately estimate transmission patterns in wireless communication systems while operating in closed loop transmit diversity modes.

BRIEF DESCRIPTION OF THE DRAWINGS

FIG. 3 is a block diagram of a channel predictor useful in the mobile transceiver of FIG. 1 in one embodiment of the present invention;

DETAILED DESCRIPTION

Figure 1:
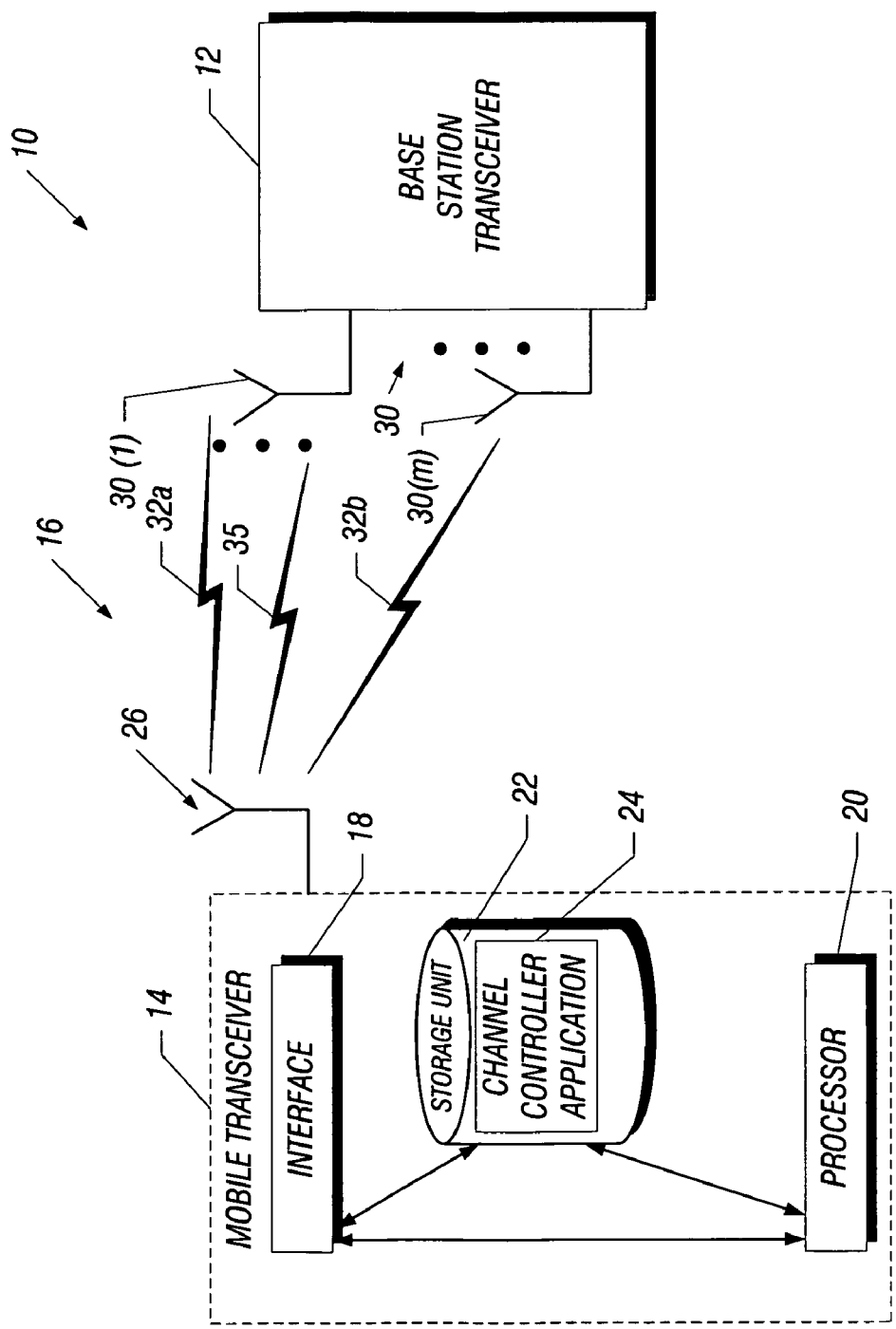
FIG. 1 is a schematic depiction of a communications system, in accordance with one embodiment of the present invention.

A communications system 10, as shown in FIG. 1, in one embodiment, includes a base station transceiver 12 that communicates with a mobile transceiver 14 over one or more radio links 16. In one embodiment, the mobile transceiver 14, shown in FIG. 1, for a mobile user unit receives, or additionally, may transmit one or more radio communications when appropriately activated. In one embodiment, the mobile transceiver 14 comprises an interface 18 and a processor 20, both coupled to a storage unit 22 on which a channel controller application 24 may be stored for processing the radio communications. As described in more detail below, the channel controller application 24, when executed, may, in one embodiment, allow the mobile transceiver 14 to receive the radio communications over one or more of the radio links 16, where the radio communications may be used to communicate with the base station transceiver 12.

As shown in FIG. 1, in one embodiment, the mobile transceiver 14 further includes an antenna 26, which receives, or, additionally, transmits a radio communication over the one or more radio links 16. The radio communication includes a first transmission signal 32A and a second transmission signal 32B from the base station transceiver 12. The base station transceiver 12 comprises a plurality of adaptive antennas 30 including a first antenna 30(1) and a second antenna 30(m) to direct both the first transmission signal 32A and the second transmission signal 32B to the antenna 26.

However, the first and second transmission signals 32A and 32B may travel to the antenna 26 via multiple propagation paths. The base station transceiver 12 may transmit a pilot channel having a plurality of pilot symbols. The mobile transceiver 14 may receive and process the pilot channel to make a determination as to whether to interact with the base station transceiver 12. After an affirmative determination by the mobile transceiver 14, future channel prediction information concerning the first transmission signal 32A and/or the second transmission signal 32B may be transmitted back to the base station transceiver 12 via a feedback channel 35. Using channel estimation, the channel prediction information may be derived. In particular, the channel controller application 24 performs channel prediction based on the channel estimation in one embodiment, thereby producing accurate estimates of future channel states that may develop for future channels between the base station transceiver 12 and the mobile transceiver 14.

Figure 2:
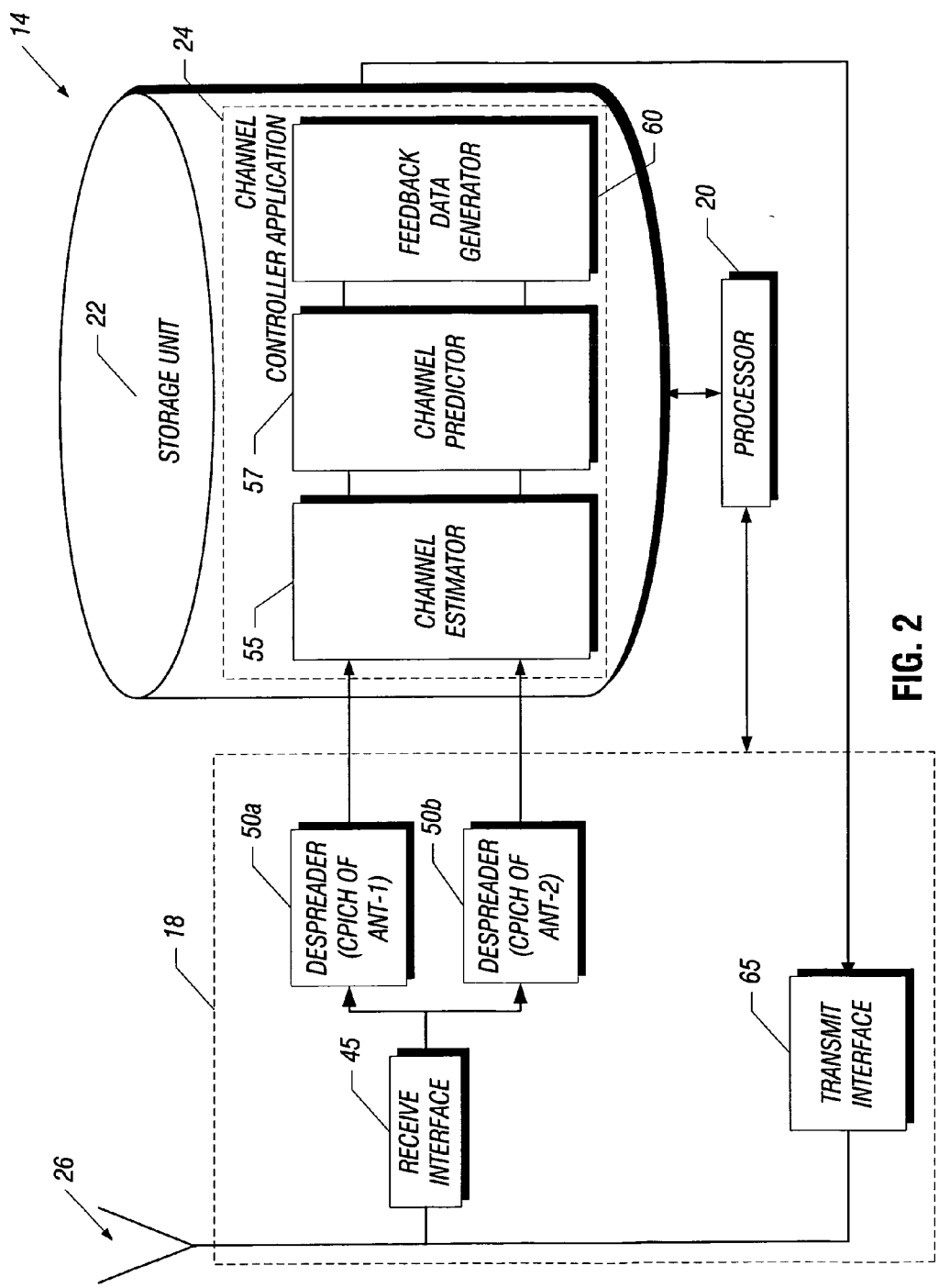
FIG. 2 is a block diagram of a mobile transceiver for a mobile user unit that may be employed in the communications system of FIG. 1, in accordance with one embodiment of the present invention.

The mobile transceiver 14 of FIG. 2 is similar to that of FIG. 1 (and therefore, similar elements carry similar reference numerals) with the addition of more details for the interface 18 and the channel controller application 24. The interface 18 includes a receive interface 45, which receives the first transmission signal 32A and/or the second transmission signal 32B for processing via a first despreader 50a and a second despreader 50b. The first and second despreaders 50a, 50b despread the first and second transmission signals 32A, 32B from the base station transceiver 12 into channel propagation paths for the first antenna 30(1) (FIG. 1) and the second antenna 30(m) (FIG. 1), respectively. Although at least two antennas, the first and second antennas 30(1) and 30(m), of the plurality of adaptive antennas 30 are used in the illustrated embodiment, however, any number of more than two antennas of the plurality of adaptive antennas 30 may be readily employed.

In one embodiment, the channel controller application 24 includes a channel estimator 55, a channel predictor 57, and a feedback data generator 60. The channel estimator 55 provides the channel estimations for the first and second antennas 30(1), 30(m) shown in FIG. 1. In turn, the channel predictor 57 predicts respective channel propagation paths from the channel estimations for the first antenna 30(1) and channel estimations for the second antenna 30(m). The feedback data generator 60 selects one or more antenna weight values from a predetermined set of weights for the first and second antennas 30(1) and 30(m) and calculates feedback information (e.g., selected weights) to be transmitted over the feedback channel 35 through a transmit interface 65. Alternatively, other appropriate feedback methods than the weight selection based as illustrated, may be advantageously used to carry feedback information concerning the channel state from the mobile transceiver 14 to the base station transceiver 12 to adjust its transmission patterns over both the first antenna 30(1) and the second antenna 30(m).

In order to perform the channel prediction, in one embodiment, the channel controller application 24 incorporates a channel estimation algorithm for the channel estimator 55, an adaptive channel prediction algorithm for the channel predictor 57, and a feedback calculation algorithm for the feedback data generator 60. First, the mobile transceiver 14 despreads the first and/or the second transmission signals 32, 32B to decorrelate the plurality of pilot symbols (e.g., the spreading sequence and/or the scrambling sequence) that may be embedded in the pilot channel. Using the channel estimation algorithm, the channel controller application 24 uses the despreaded outputs to estimate the channel parameters (e.g., phase and amplitude) for each propagation path. The resulting channel parameters are then used by the channel controller application 24 to predict the future channel state through the adaptive channel prediction and feedback calculation algorithms. As the input to the feedback calculation algorithm is the channel prediction algorithm output instead of the output based from the channel estimation algorithm, this enables the channel controller application 24 to accurately match a future state of transmission for a future channel. In one embodiment, the future channel is the actual channel that will be present between the base station transceiver 12 and the mobile transceiver 14 at a specified time.

In operation, the base station transceiver 12 of FIG. 1, in one embodiment, transmits to the mobile transceiver 14 shown in FIGS. 1 and 2, a pilot channel over the one or more radio links 16. The pilot channel may include a first common pilot channel (CPICH) signal associated with the first antenna 30(1) and a second common pilot channel (CPICH) signal associated with the second antenna 30(m) in one embodiment. Upon receipt of the first and second common pilot channel signals, the processor 20 using the channel controller application 24 processes the first transmission signal 32A and/or the second transmission signal 32B. The channel controller application 24 generates the future prediction information (described in more detail below) for future channels that may exist over the one or more radio links 16 from base station transceiver 12 for the mobile transceiver 14.

According to one embodiment of the present invention for a channel (e.g., the first transmission signal 32A or the second transmission signal 32B), the future channel prediction information comprises channel prediction terms. The channel controller application 24 derives first channel estimation terms from the first common pilot channel signal and second channel estimation terms from second common pilot channel signal. In one embodiment, the first and second channel estimation terms may be stored in the storage unit 22 for use to determine the channel prediction terms. As the channel estimation terms from each antenna of the plurality of adaptive antennas 30 may be associated with several propagation paths which arrive at different times, they can be advantageously stored in the storage unit 22 for later use with other estimations from all other propagation paths. Accordingly, the channel prediction terms may be adaptively calculated from the first and second channel estimation terms by the channel controller application 24 in an iterative manner having one or more iterations (described in more detail later in the context of a software implementation of one embodiment the present invention). Thus, the future state of the channel may be predicted at the specified time based on the channel prediction terms. Using the channel prediction terms, a future transmission pattern may be adaptively controlled to match a future channel state.

In one embodiment, the first channel estimation terms may correspond to a channel estimation term calculated in at least one iteration prior to a current iteration of the one or more iterations. Likewise, the second channel estimation terms may correspond to a channel estimation term calculated in the current iteration of the one or more iterations.

As an example, the first common pilot channel signal is received from the first antenna 30(1) and the second common pilot channel signal is received from the second antenna 30(m). First and second channel propagation paths associated with the first and second antennas 30(1), 30(m) may be separated based on the first and second common pilot channel signals. For the first and second channel propagation paths, phase and magnitude of the channel (e.g., the first transmission signal 32A or the second transmission signal 32B) may be estimated to derive the first and second channel estimation terms in one embodiment.

Using the channel prediction and feedback calculation algorithms, in one embodiment, a selection of a particular antenna weight value may enable an accurate matching of a future state of transmission to a future channel state. Since a set of allowed antenna weights are known a priori and may not change over time, can be determined a priori for all possible values of weights and stored in a lookup table. Alternatively, the set of allowed antenna weights may be periodically updated, if desired. In any case, the set of allowed antenna weights may be advantageously stored either in the mobile transceiver 14, the base station transceiver 12, or remotely in any suitable storage device.

For example, the channel controller application 24, in one embodiment receives one or more weighted values associated with one or more antennas of the plurality of adaptive antennas 30. Based on the channel prediction terms determined by the channel controller application 24, at least one weighted value may be selected from the one or more weighted values, which may be provided over the feedback channel 35 to the first and second antennas 30(1), 30(m) to accurately match a future state of the channel (e.g., the first transmission signal 32A or the second transmission signal 32B) at the specified time.

The channel prediction algorithm may be trained from the first and second (e.g., past and present) channel estimation terms associated with each antenna, to learn channel propagation paths resulting from transmission patterns for any participating antenna of the plurality of the adaptive antennas 30. Thus, to adjust a future transmission pattern of the transmitter from a particular antenna, such as that of the first and second antennas 30(1), 30(m) one or more antenna transmission characteristics may be adaptively controlled based on the channel prediction terms. To this end, based on the channel prediction terms, a specific antenna weighted value may be selected for that particular antenna for accurately matching of the future state of transmission of the future channel from the particular antenna.

In particular, from prediction of channel propagation paths based on transmission patterns, the feedback calculation algorithm of the channel controller application 24 may find the best antenna weighted value out of the set of allowed antenna weights to be applied to an active or participating antenna for matching the future state of transmission to the future channel from the active or participating antenna at a specified time according to one embodiment of the present invention. The selected antenna weighted value, or in some situations a plurality of selected antenna weighted values for one or more active or participating antennas, may be coded (e.g., as 2 or 4 bits) and signaled to the base station transceiver 12 through the interface 18 and the antenna 26 over the feedback channel 35, in one embodiment. The base station transceiver 12 receives the selected antenna weighted value from the feedback channel 35 to multiply with an antenna input of the antennas 30(1) and/or 30(m) the selected antenna weight value. For example, the selected antenna weight value may be applied to the antenna input of at least one of the first and second antennas 30(1), 30(m), or alternatively, to both the first and second antennas 30(1), 30(m). In this way, the selection of a particular antenna weight value may enable an accurate matching of the future state of transmission to the future channel state.

One embodiment of the present invention includes transmitting data using the plurality of adaptive antennas 30 that transmit data using a method of transmission known as "a transmit diversity mode." Transmitting data with the plurality of adaptive antennas 30 is a technique implemented by measuring the channel characteristics and modifying the gain and phase of signals applied to each antenna input of an active antenna array including the first antenna 30(1) and/or the second antenna 30(m) in order to create an antenna transmission pattern that maximizes the power delivered to the mobile user unit. Thus, by employing a transmit diversity mode at the base station transceiver 12, in one embodiment, the distortions from multipath interference may be significantly reduced in the mobile transceiver 14. More specifically, specific multipath events can be avoided since the spacing of the plurality of adaptive antennas 30 ensures that not both of the first and second antennas 30(1), 30(m) will experience the same multipath event at the same time.

In one embodiment, an adaptive antenna array approach, however, performs channel estimation including, constant measurement and feedback of the channel characteristics and the subsequent recalculation of adaptive antenna array weights used to modify signals from each transmitting or active antenna located at the base station transceiver 12. This real-time constant measurement and feedback may cause substantial loop delay in a closed loop transmit diversity mode. More specifically, a substantial portion of the loop delay may be caused by feedback channel timing requirements (e.g., the time needed to transmit the feedback information over the feedback channel 35). Furthermore, the time needed to measure and compute the adaptive antenna array weights may limit the speed at which an antenna transmission may be adjusted to reflect the state of a changing traffic channel. In general, this may not be of a great concern when the mobile transceiver 14 may be moving at a low speed thus providing appropriate time for adaptation of the antenna transmission. Conversely, at a relatively higher speed, the traffic channel may change at a much higher rate than its rate of compensation.

As an example, a close loop diversity mode is used widely in Wide Band Code Division Multiple Access (WBCDMA) communication systems and other communication applications. Likewise, estimation of parameters to estimate transmission of traffic channels is also a common practice. According to the Third Generation Partnership Project (3GPP) standard for a WBCDMA communication system, a closed loop diversity mode is described in which a base station transmits information to a user equipment (UE) through two antennas. See "Closed Loop Mode Transmit Diversity," Technical Specification 25.214 v3.5.0, Section 7 in 3GPP TS 25.214 v3.5.0 (2000-12) available from the Third Generation Partnership Project, 650 Route des Lucioles-Sophia Antipolis, Valbonne-France. The phase/amplitude difference between the two antennas is determined by the user equipment through the feedback channel 35. However, a time delay of the feedback channel significantly degrades the performance of the WBCDMA communication system as it limits the operation of the WBCDMA communication system to low user equipment velocities.

A typical closed loop transmit diversity mode may use the feedback channel 35 to transmit feedback information, such as at a rate of 1500 bits per second (bps). As an example, transmission of a feedback word (e.g., 2 to 4 bits wide) may result in an effective feedback delay of 0.7 to 1.3 milliseconds (ms) (excluding appropriate propagation delay and processing delay). Embodiments of the present invention are in no way limited to system with the enumerated characteristics.

When the user equipment moves at a low velocity, performance of the closed loop transmit diversity mode may be marginally degraded based on this delay, but such delay can cause substantial performance degradation when the velocity of the user equipment increases beyond certain threshold. For instance, typically, the deployment of WBCDMA closed loop transmit diversity modes in WBCDMA communication systems is limited to user equipment that travels at velocities less than 40 km/h. Thus, these modes can only be used mostly for pedestrians, or for slow vehicles. However, use of these modes for user equipment moving at high velocities (e.g., up to 120 km/h) may be desirable for a variety of reasons.

First, operation of these modes is attractive at higher user equipment velocities to significantly increase network capacity and performance. However, reducing the effective delay of the loop to improve user equipment performance in the 3GPP closed loop diversity mode may be difficult at higher user equipment velocities. Second, many cellular systems may also opt to implement these modes when operating these modes at higher user equipment velocities. However, achieving reasonable performance in the closed loop transmit diversity modes at user equipment velocities higher than 60 km/h may be difficult. Therefore, an ability to enable close loop transmit diversity modes at high user equipment velocities is desired.

For this purpose, in one embodiment, the first and second antennas 30(1), 30(m) of plurality of adaptive antennas 30 may be operated in a closed loop transmit diversity mode. An adaptive feedback for channel prediction terms comprising the at least one weighted value of the one or more weighted values may be provided over the feedback channel 35 to the first and second antennas 30(1), 30(m) of the plurality of adaptive antennas 30. In this way, at the specified time, the future transmission patterns from at least one antenna of the first and second antennas 30(1), 30(m) may be controlled to substantially reduce the effective loop delay in the closed loop transmit diversity mode.

The channel controller application 24, in another embodiment, uses an adaptive channel prediction algorithm in the mobile transceiver 14 to predict a channel state at a specified future time, thereby reducing the effective delay in the closed loop. In one embodiment, such use of the adaptive channel prediction algorithm, for example, may improve the performance of the mobile transceiver 14 while operating in a 3GPP closed loop diversity mode, and may enable the operation of this mode for the mobile transceiver 14 at higher velocities.

The adaptive channel prediction algorithm provides the channel prediction to generate a future prediction of each of the channel propagation paths (from each of the plurality of adaptive antennas 30). The predictions of the channel (e.g., the first transmission signal 32A or the second transmission signal 32B) ideally be as close as possible to the actual state of the channel (e.g., the first transmission signal 32A or the second transmission signal 32B) over the radio links 16 at the future time in which the base station transceiver 12 will apply the relevant antenna weighted value to an antenna input of a participating or active antenna among the plurality of adaptive antennas 30. More specifically, the predictions of the channel may match the average channel state at the range of times that the specific antenna weighted value or values (computed at present time) will be effective at the base station transceiver 12.

Another embodiment that can be used in other closed loop transmit diversity algorithms involves keeping the same feedback calculation algorithm, and using as its input the prediction of the future channel state instead of the channel estimation. For example, some algorithms may transmit on the feedback channel 35 a quantization of the channel only (and the actual weight optimization is performed on the base station transceiver 12). For such algorithms, one embodiment may increase the performance by sending on the feedback channel 35, a quantization of the prediction of the channel instead of the channel estimations.

In one embodiment, the channel predictor 57 including an adaptive channel prediction algorithm including two mechanisms as illustrated in FIG. 3, an adaptation mechanism 75, and a plurality of prediction mechanisms 80(1) through 80(n). The channel predictor 57 of FIG. 3 is similar to that of FIG. 2 (and therefore, similar elements carry similar reference numerals) with the addition of the adaptive mechanism 75 and the prediction mechanisms 80(1) through 80(n). Using the adaptive mechanism 75 and the plurality of prediction mechanisms 80(1) through 80(n), the channel predictor 57 predicts the channel propagation paths. In some situations, both the adaptive mechanism 75 and the prediction mechanisms 80(1) through 80(n) may be wholly implemented in hardware, or alternatively, in software. On the other hand, however, in some case, a suitable combination of partial hardware and software may be advantageously deployed for implementing the adaptive mechanism 75 and the prediction mechanisms 80(1) through 80(n).

Various known algorithms may readily perform either of these mechanisms or both of them simultaneously. The adaptation mechanism 75 learns the spectrum of the channel variations or the velocity at which the mobile transceiver 14 (FIG. 1) moves or other equivalent parameters. In one embodiment, the adaptation mechanism 75 uses the present and past channel estimations of all propagation paths (from both the first and second antennas 30(1), 30(m)) together to learn the channel parameters. The plurality of prediction mechanisms 80(1) through 80(n) use the data generated by the adaptation mechanism 75 and the channel estimations from the channel estimator 55 to produce the channel prediction. In one embodiment, each prediction mechanism of the plurality of prediction mechanisms 80(1) through 80(n) operates separately for each propagation path.

Of course, similar adaptive channel prediction algorithms also may be readily applied when more than two antennas are transmitting. Although the method of operation may be identical, usually the overall improvement may be significantly higher than a two-antenna scenario. In this case, among other reasons, the improvement may be significantly higher since as the number of antennas increase, the amount of required feedback information increases. Therefore, the loop delay caused by sending this feedback information is substantially increased. As a result, the improvement from the adaptive channel prediction algorithm may be relatively higher whenever the loop delay increases. Thus, while using more than two antennas, the effective reduction of such loop delay by the adaptive channel prediction algorithm may produce significant improvement compared to a system without prediction.

Figure 4A:
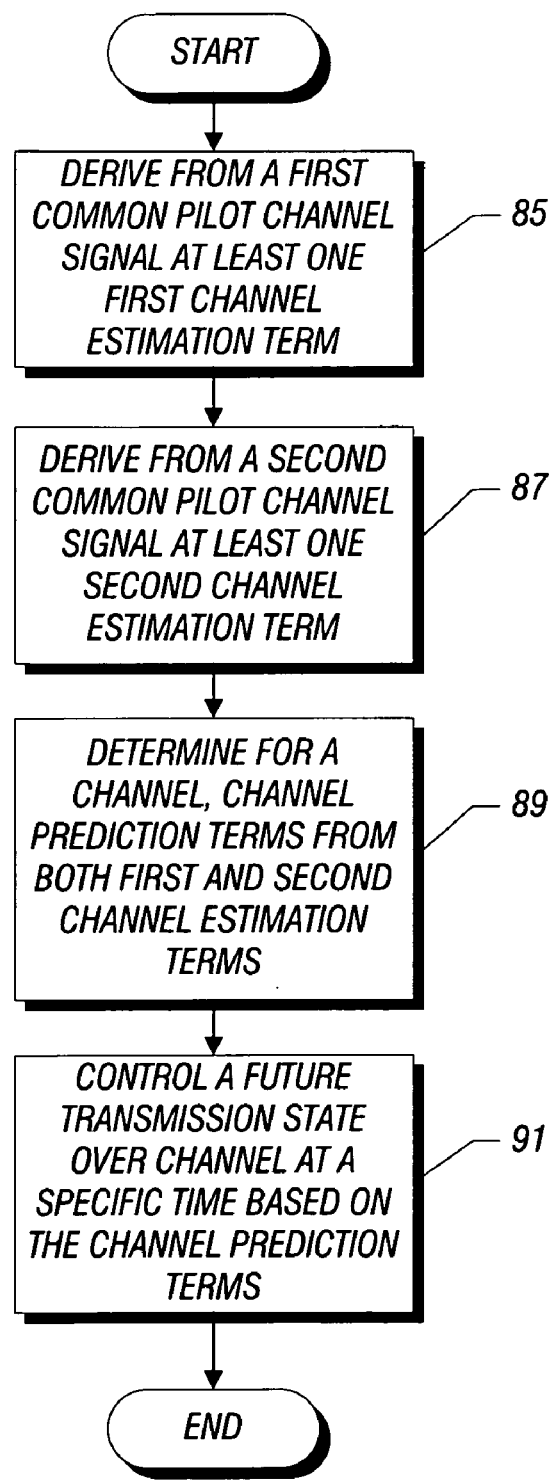
FIG. 4A is a flow chart in accordance with one embodiment of the present invention.
Figure 4B:
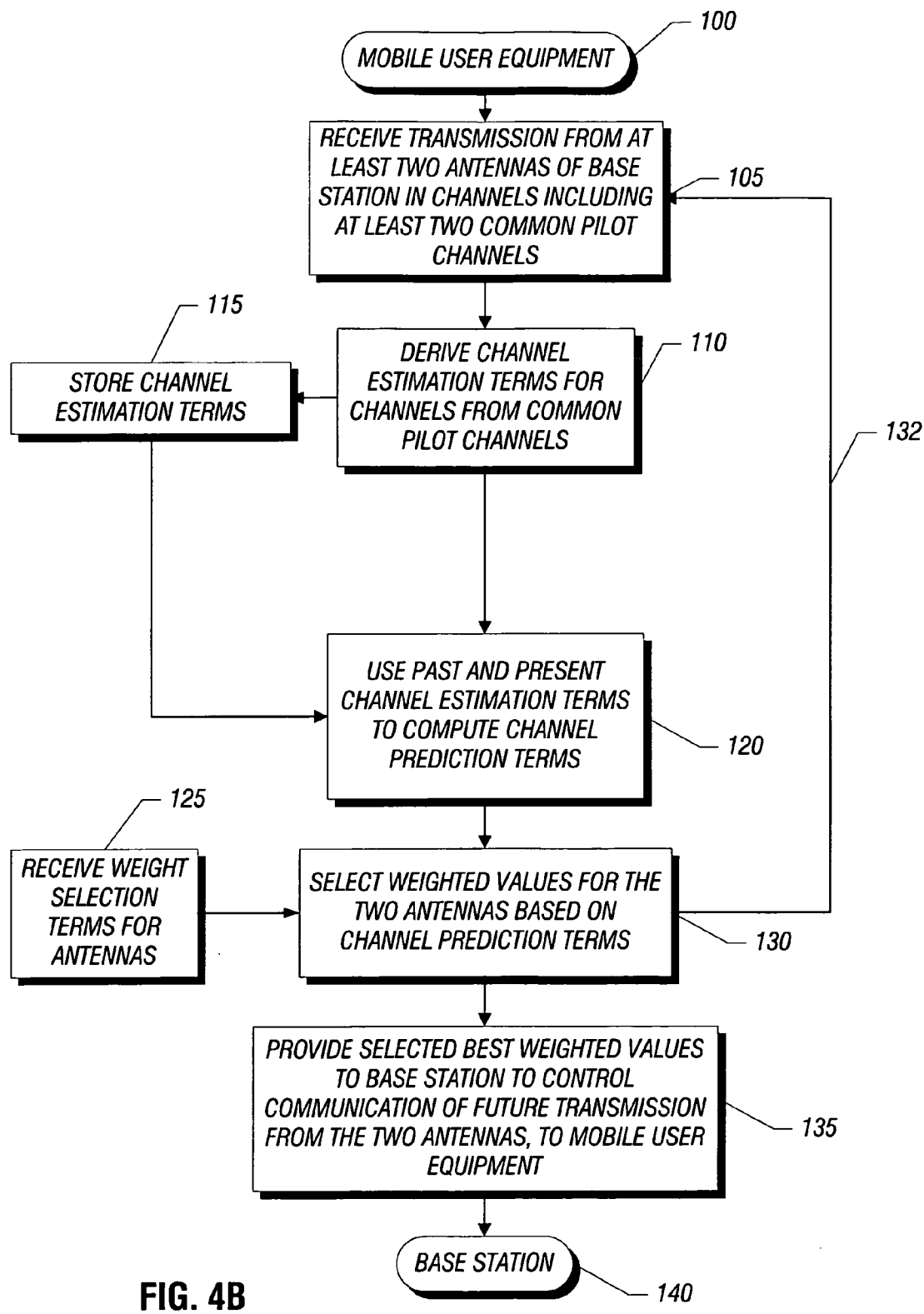
FIG. 4B is a flow chart in accordance with one embodiment of the present invention.

FIGS. 4A and 4B show programmed instructions performed by the channel controller application 24 (FIG. 1) of the mobile transceiver 14 (FIG. 1) according to one embodiment of this invention. As shown in FIG. 4A, at block 85, from a first common pilot channel signal at least one first channel estimation term may be derived. Likewise, at block 87, from a second common pilot channel signal, at least one second channel estimation term may be derived. At block 89, for a channel, channel prediction terms may be determined from both the first and second channel estimation terms. Based on the channel prediction terms, at block 91, a future transmission pattern of the transmitter at a specific time may be controlled.

In one embodiment, the mobile transceiver 14, such as mobile user equipment may use programmed instructions 100 (e.g., software code) when a transmission is received from at least two antennas 30(1), 30(m) (at block 105) of the base station transceiver 12 in channels including at least two common pilot channel signals as shown in FIG. 4B. Next, the channel estimation terms may be derived (at block 110) from the two common pilot channel signals. The output signal results, which include the channel estimation terms, may be stored (at block 115) for the present case in the storage unit 22 (FIG. 1) from which they can be later accessed.

To compute the channel prediction terms for selecting one or more weighted values for the two antennas 30(1) and 30(m), the past and present channel estimation terms may be used (at block 120) by the channel controller application 24 (FIG. 2). Particularly, in one embodiment, a set of weight selection terms for antennas at a base station (e.g., the base station tranceiver 12 (FIG. 1)) may be received (at block 125). Based on the channel prediction terms, the weight selection terms may be used to select weighted values for the two antennas (at block 130). One or more adaptive iterations 132 may be performed to accurately estimate or predict future transmission patterns of the first and second antennas 30(1) and 30(m) for the mobile user equipment through the programmed instructions 100. The selected weighted values may be fed back to the base station (at block 135), which may accurately estimate or control the future state of transmissions from the first and second antennas 30(1), 30(m) located at the base station transceiver 12 at the block 140.

Figure 5:
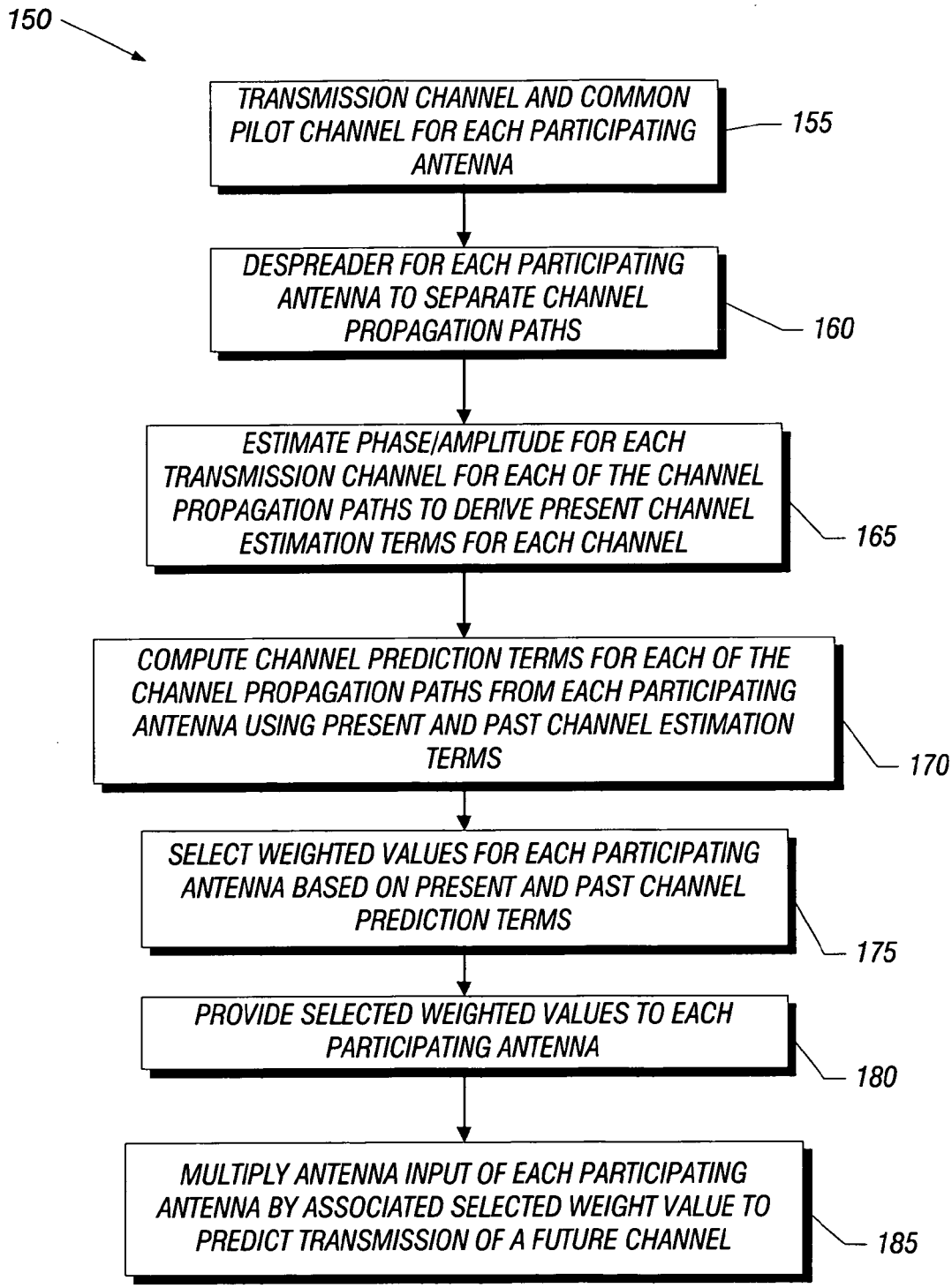
FIG. 5 is a flow chart in accordance with one embodiment of the present invention.

As shown in FIG. 5, in accordance with one embodiment of the present invention, the adaptive channel prediction algorithms illustrated in FIGS. 4A and 4B may be implemented by channel prediction software 150. In such case, each of the actions indicated by blocks 105 through 135 (FIG. 4B) may be implemented in software after receiving the results of the operations, which, may be implemented in hardware. Additionally, the channel prediction software 150 may be stored, in one embodiment, in a processor-based system, such as the mobile transceiver 14 of the communications system 10 shown in FIG. 1.

In general, at block 155, the channel prediction software 150 receives transmission channels (e.g., first and second transmission signals 32A, 32B of FIG. 1) and common pilot channel signals for each participating antenna of the plurality of adaptive antennas 30 (FIG. 1). Using information determined at block 105 (FIG. 4B) the channel prediction software 150 despreads the transmission channel and common pilot channel signals for each antenna to separate channel propagation paths at block 110 and 115 (FIG. 4B). Then, the channel prediction software 150 may estimate phase/amplitude for each transmission channel for each of the channel propagation paths to derive present channel estimation terms for each channel, as shown in block 165.

Using present channel estimation terms and accessing past channel estimation terms (e.g., stored in storage unit 22 of FIG. 1), the channel prediction software 150 may compute channel prediction terms for each of the channel propagation paths for each participating antenna as depicted in block 170. In turn, the weighted values for each participating antenna based on the present and past channel prediction terms may be determined from the received weight selection terms for antennas as included in block 175. From here, the selected weighted values may be provided to each participating antenna as shown in block 180. Finally, antenna inputs of each participating antenna of the plurality of adaptive antennas 30 (FIG. 1) may be multiplied with the selected weighted value to predict the transmission of a future channel as indicated in block 185.

Figure 6:
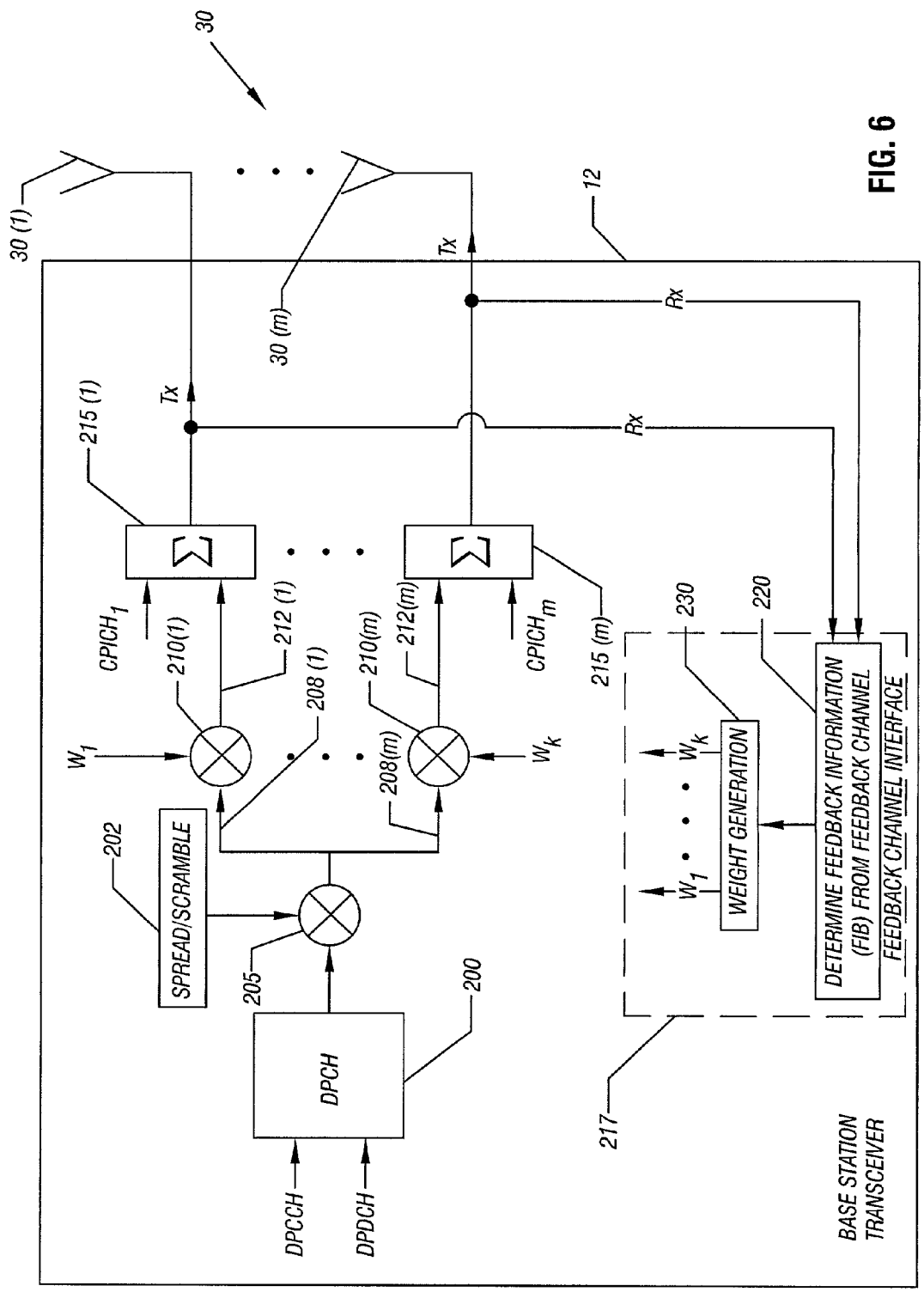
FIG. 6 is a general architecture of a base station transceiver of FIG. 1 for use at a base station in accordance with one embodiment of the present invention that may enable channel prediction in closed loop mode transmit diversity for predicting transmission to the mobile transceiver of FIG. 1 at a specified time in future.

For the base station transceiver 12, a general architecture is shown in FIG. 6 that may enable, in one embodiment, channel prediction in closed loop mode transmit diversity for a dedicated physical channel (DPCH) transmission 200 to the mobile transceiver 14 (FIG. 1) at a specified time in future. As shown in FIG. 6, the DPCH transmission 200 may be formed from a dedicated physical control channel (DPCCH) and a dedicated physical data channel (DPDCH). Using a spread-scramble module 202 and a first multiplier 205, a variety of transmission functions including, but not limited to, channel coding, interleaving and spreading are carried out essentially in a same manner as typically performed in many conventional wireless communication systems to generate a set of spread-scramble signals 208(1) through 208(m).

One or more antenna specific weighted selected values (e.g., $w_1$ through $w_k$) may weight the set of spread-scramble signals 208(1) through 208(m) via a set of second multipliers 210(1) through 210(m) to provide a set of weighted-spread-scramble signals 212(1) through 212(m). The set of weighted-spread-scramble signals 212(1) through 212(m) are then combined with respective common pilot channel of the common pilot channels $CPICH_1$ through $CPICH_m$ at a corresponding summer 215 of a set of summers 215(1) through 215(m).

Finally, the set of weighted-spread-scramble signals 212(1) through 212(m) is fed through the plurality of adaptive antennas 30 for transmission to the mobile transceiver 14. To adapt the plurality of adaptive antennas 30 using the antenna specific selected weighted values, the base station transceiver 12 further comprises a feedback channel interface 217. In the channel interface 217, feedback information (FIB) (e.g., weight selection information for the future state of the traffic channel from the mobile transceiver 14 (FIG. 1) including the antenna specific selected weighted values associated with phase adjustments in a first closed loop mode, and phase and amplitude adjustments in a second closed loop mode) may be received at the block 220 over the feedback channel 35 (FIG. 1) from the mobile transceiver 14. Then the antenna specific selected weighted values (e.g., $w_1$ through $w_k$) may be generated at the block 230 in the base station transceiver 12.

In one embodiment, the antenna specific selected weighted values are determined from the channel prediction information derived from the feedback channel 35. Thus, in response to the channel prediction information concerning the future state of the traffic channel to the mobile transceiver 14 (FIG. 1), the antenna specific selected weighted values are generated at the block 230 in the base station transceiver 12 to control at the specified time a transmission pattern over the traffic channel from the various number of antennas of the plurality of adaptive antennas 30.

In one embodiment, the selected antenna specific weighted values determined by the mobile transceiver 14 (FIG. 1) may be signaled to the base station transceiver 12 (e.g., Universal Mobile Telecommunications System-Terrestrial Radio Access Network (UMTS-UTRAN) access point of the base station transceiver 12) using n-bits of the feedback information (FIB) field of the feedback channel 35 (e.g., an uplink dedicated physical control channel (DPCCH)). See "A Regulatory Framework for UMTS" Report No. 1, available from UMTS Forum Secretariat, Russell Square House, 10-12 Russell Square, London, WC1B 5EE, United Kingdom.

In one embodiment, to compute the feedback information (FIB), the mobile transceiver 14 uses the common pilot channel (CPICH) to separately estimate the channels seen from the first and second antennas 30(1), 30(m). For instance, once every slot, the mobile transceiver 14 computes the phase adjustment, $\phi$, and the amplitude adjustment that is to be applied at the UTRAN access point of the base station transceiver 12 to maximize the mobile transceiver 14 received power. In one case, a selection of the best antenna specific weighted value may be accomplished by e.g., solving for an antenna specific weighted value that maximizes received power defined as a function of channel prediction terms derived from the estimated channel impulse responses for the first and second antennas 30(1) and 30(m). Alternatively, the best antenna specific weighted value may be, for example, determined to maximize a criterion being a function of the channel prediction terms derived from an estimated channel impulse response. Alternatively, another appropriate method based on maximizing signal-to-interference ratio (SIR) may be advantageously used for weight selection.

In operation, the mobile transceiver 14 feeds back over the feedback channel 35 (FIG. 1) to the base station transceiver 12 (e.g., to the UTRAN access point) the feedback information for adaptation of the first and second antennas 30(1) and 30(m), i.e., based on which phase and/or amplitude settings to be adjusted accordingly. In one embodiment, a set of feedback signaling message (FSM) bits are transmitted over the feedback channel 35. The FSM bits may be embedded in a FIB field of uplink DPCCH slot(s) (e.g., the transmit power control (TPC) field in the 3GPP standard) assigned to the closed loop mode transmit diversity. The FIB field is used to transmit the amplitude, i.e., power and phase settings corresponding to the best antenna specific weighted value, respectively.

The mobile user unit or user equipment (UE) (such as mobile transceiver 14 (see FIG. 1)), in one embodiment, may be any processor-based system including a wireless phone, computer, personal digital assistant (PDA), pager, portable music player, or any other device capable of receiving information over one or more communication links (such as the radio links 16 (see FIG. 1)). In one embodiment, the mobile user unit or user equipment may be a readily transportable device, such as a hand-held device.

The mobile user unit or user equipment, in one embodiment, may be a battery-powered device where the battery serves as the main power supply for the mobile user unit or user equipment for the duration during which no electrical power is supplied from an external, fixed power source, such as an electrical outlet. In one embodiment, storage device or media (such as storage unit 22 (see FIG. 1)) may be a memory device such as a flash memory. Of course, other suitable memory devices or media may be advantageously deployed. The various software algorithms, or applications (such as channel controller application 24 (see FIG. 1)) may be executable on control or processing units (such as processor 20 (see FIG. 1)). Each control or processing unit may include a microprocessor, a microcontroller, a processor card (including one or more microprocessors or controllers), or other control or computing devices.

As examples, the storage device or media (such as storage unit 22 (see FIG. 1)) referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Furthermore, instructions that make up the various software algorithms, or applications in the various system components may be stored in respective storage devices. The instructions when executed by a respective control or processing unit cause the corresponding component to perform programmed acts.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining channel prediction terms for a channel, from both first channel estimation terms derived from a first common pilot channel signal and second channel estimation terms derived from a second common pilot channel signal;
    adaptively calculating channel prediction terms from first and second channel estimation terms by receiving antenna transmission characteristics associated with one or more antennas of a plurality of antennas in order to controllably adjust the future transmission patterns of the channel and selecting at least one antenna transmission characteristics from the antenna transmission characteristics based on the channel prediction terms; and enabling control over future transmission patterns of the channel using the channel prediction terms.

2. The method of claim 1, including predicting a future state of the channel at a specified time based on the channel prediction terms.

3. The method of claim 2, including storing the first and second channel estimation terms in order to determine the channel prediction terms in response to the first and second common pilot channel signals, respectively.

4. The method of claim 1, wherein adaptively calculating includes receiving one or more weighted values associated with one or more antennas of a plurality of antennas where said first common pilot channel signal is from a first antenna of the plurality of antennas and said second common pilot channel signal is from a second antenna of the plurality of antennas.

5. The method of claim 4, including:
selecting at least one weighted value from the one or more weighted values based on the channel prediction terms;
providing the at least one weighted value to the first and second antennas to accurately assess the future state of the channel at the specified time; and
separating first and second channel propagation paths associated with the first and second antennas based on the first and second common pilot channel signals.

6. The method of claim 5, including estimating phase and magnitude of the channel for the first and second channel propagation paths to derive the first and second channel estimation terms.

7. The method of claim 1, including using a feedback signal based on the channel prediction terms to control the future transmission patterns of the channel according to the future state of the channel at the specified time.

8. The method of claim 4, including operating the first and second antennas of the plurality of antennas in a closed loop transmit diversity mode.

9. The method of claim 8, including providing feedback, including the at least one weighted value of the one or more weighted values, to the first and second antennas of the plurality of antennas.

10. The method of claim 9, including controlling at the specified time a transmission pattern over the channel from at least one antenna of the first and second antennas to match the future state of the channel and substantially reduce the effective loop delay in the closed loop transmit diversity mode.

11. The method of claim 1, wherein the first channel estimation terms correspond to a channel estimation term calculated in at least one iteration prior to a current iteration of the one or more iterations.

12. The method of claim 11, wherein the second channel estimation terms correspond to a channel estimation term calculated in the current iteration of the one or more iterations.

13. A wireless device comprising:
a communication interface;
a processor coupled to the communication interface; and
a storage coupled to the processor, said storage storing instructions to:
determine for a traffic channel directed to the communication interface, channel prediction terms from both first channel estimation terms derived from first common pilot channel signal and second channel estimation terms derived from second common pilot channel signal,
predict a future state of the traffic channel at a specified time based on the channel prediction terms,
control future transmission patterns using the future state of the traffic channel at the specified time; and
the storage to store the first and second channel estimation terms in order to determine the channel prediction terms in response to the first and second common pilot channel signals, respectively.

14. The wireless device of claim 13 comprises a transceiver adapted to communicate with a base transceiver in a closed loop transmit diversity mode.

15. A mobile transceiver comprising:
a communication interface;
a processor coupled to the communication interface; and
a storage coupled to the processor, said storage storing instructions to:
determine for a traffic channel directed to the communication interface, channel prediction terms based on channel estimation terms derived from common pilot channel signals of at least two antennas,
in response to the common pilot channel signals, predict a future state of the traffic channel at a specified time and provide feedback information over a feedback channel,
control future transmission patterns over the at least two antennas using the future state of the traffic channel at the specified time; and
the storage to store the first and second channel estimation terms in order to determine the channel prediction terms in response to the first and second common pilot channel signals, respectively.

16. The mobile transceiver of claim 15 comprises one or more antennas coupled to the communication interface, said one or more antennas adapted to communicate with a base station in a closed loop transmit diversity mode.

* * * * *